United States Patent [19]

Welsh et al.

[11] Patent Number: 4,841,575
[45] Date of Patent: Jun. 20, 1989

[54] IMAGE ENCODING AND SYNTHESIS

[75] Inventors: William J. Welsh, Ipswich; Brian A. Fenn, Woodbridge; Paul Challener, Ipswich, all of England

[73] Assignee: British Telecommunications public limited company, Great Britain

[21] Appl. No.: 930,473

[22] Filed: Nov. 14, 1986

[30] Foreign Application Priority Data

Nov. 14, 1985 [GB] United Kingdom ............... 8528143

[51] Int. Cl.$^4$ .............................................. G10L 5/02
[52] U.S. Cl. ....................................... 381/36; 381/48; 382/2; 382/16; 364/513.5
[58] Field of Search ................................. 381/36–51; 364/513, 513.5; 379/52–54; 382/1, 2, 16, 18, 19

[56] References Cited

U.S. PATENT DOCUMENTS 3,662,374  5/1972  Harrison et al. ............... 381/48 X
4,104,625  8/1978  Bristow et al. ................. 381/48 X

OTHER PUBLICATIONS

Bell Laboratories Record, vol. 48, No. 4, Apr. 1970, pp. 110–115, Murray Hill, U.S.; F. W. Mounts: "Conditional Replenishment: a promising technique for Video Transmission" p. 110, left-hand column, line 15-right-hand column, line 7; p. 111. left-hand column, lines 1–13; p. 113, left-hand column.
"Picture Recognition and Data Structure", Graphic Languages-ed Nake and Rosenfield, 1972, pp. 52–68, NAGAO.
K. W. Berger-Speechreading: Principles and Methods, Baltimore: National Education Press, 1972, pp. 73–107.
Proceedings of the Institute of Acoustics (Proc. I.O.A. vol. 6 Part 4, 1984) "Roles of Lips and Teeth in Lipreading Vowels"-Matthew McGrath et al. pp. 400–409.
Journal of Phonetics (1983) 11, 63–76 "Analysis, Synthesis, and Perception of Visible Articulatory Movements" by N. M. Brooke and Quentin Summerfield, pp. 64–76.

*Primary Examiner*—Peter S. Wong
*Assistant Examiner*—Emanuel Todd
*Attorney, Agent, or Firm*—Nixon & Vanderhye

[57] ABSTRACT

Visual images of the face of a speaker are processed to extract during a learning sequence a still frame of the image and a set of typical mouth shapes. Encoding of a sequence to be transmitted, recorded etc. is then achieved by matching the changing mouth shapes to those of the set and generating codewords identifying them. Alternatively, the codewords may be generated to accompany real or synthetic speech using a look-up table relating speech parameters to codewords. In a receiver, the still frames and set of mouth shapes are stored and received codewords used to select successive mouth shapes to be incorporated in the still frame.

17 Claims, 6 Drawing Sheets

```
 0  000000
 1  000000
 2  00000
 3  0000
 4  0000
 5  0000
 6  000000
 7  00000
 8  00000
 9  00000
10  00000
11  00000
12  00000
13  0000
14  000
15  00
16  0
17  0
18  00000
19  000000000
20  00000000000
21  0000000000000
22  00000000000000    ◄──── BOTTOM OF NOSE
23  00000000000000
24  00000000000
25  0000000000
26  000000
27  000000
28  00000
29  000
30
31
32
33  0000
34  000000000000
35  00000000000000    ◄──── MOUTH
36  00000000000000
37  000
38
39
40
41  0000
42  00000000000000    ◄──── LOWER LIP
43  00000000000000
44  0000000000
45  000000
46  0000
47  000
48
49  0
50  0
51  0
52  0
53
54
55
56
57
58  0
59  00
```

*Fig. 7.*

Fig. 8. BINARY IMAGE OF MOUTH AREA (MOUTH OPEN)
[○—BLACK PELS, •—WHITE PELS]

Fig. 9. BINARY IMAGE OF MOUTH AREA (MOUTH CLOSED)
[○—BLACK PELS, •—WHITE PELS]

EYE LEVEL
MID LEVEL
CHIN LEVEL

IMAGE ENCODING AND SYNTHESIS

The present invention concerns the coding of moving images in which a human face is represented. It is concerned to achieve low transmission rates by concentrating on movements associated with speech. The invention also permits the synthesis of such images to accompany real or synthetic speech.

According to a first aspect of the invention there is provided an apparatus for encoding a moving image including a human face comprising:

means for receiving video input data;
means for output of data representing one frame of the image;
identification means arranged in operation for each frame of the image to identify that part of the input data corresponding to the mouth of the face represented and (a) in a first phase of operation to compare the mouth data parts of each frame with those of other frames to select a representative set of mouth data parts, to store the selected parts and to output the selected parts;

(b) in a second phase to compare the mouth data part of each frame with those of the stored set and to generate a codeword indicating which member of the set the mouth data part of that frame most closely resembles.

According to the second aspect of the invention there is provided a receiver for decoding a moving image including a human face, the receiver comprising:

frame store means for receiving and storing data representing one frame of the image;
means for repetitive readout of the frame store to produce a video signal;
further store means receiving and storing a set of selected mouth data parts; and
control means arranged in operation to receive input codewords and in response to each codeword to read out the corresponding mouth data part from the further store and to effect insertion of that data into the data supplied to the readout means.

According to a third aspect of the invention there is provided a speech synthesiser including means for synthesis of a moving image including a human face, comprising;

(a) means for storage and output of the image of a face;

(b) means for storage and output of a set of mouth data blocks each corresponding to the mouth area of the face and representing a respective different mouth shape;

(c) speech-synthesis means responsive to input information identifying words or parts of words to be spoken;

(d) means storing a table relating words or part of words to codewords identifying mouth data blocks or sequences thereof;

(e) control means responsive to the said input information to select for output the corresponding codewords or codeword sequences from the table.

According to a fourth aspect of the invention there is provided an apparatus for synthesis of a moving image, comprising:

(a) means for storage and output of the image of a face;

(b) means for storage and output of a set of mouth data blocks each corresponding to the mouth area of the face and representing a respective different mouth shape;

(c) an audio input for receiving speech signals and frequency analysis means responsive to such signals to produce sequences of spectral parameters;

(d) means storing a table relating spectral parameter sequences to codewords identifying mouth data blocks or sequences thereof;

(e) control means responsive to the said spectral parameters to select for output the corresponding codewords or codeword sequences from the table.

Some embodiments of the invention will now be described, by way of example, with reference to the accompanying drawings, in which.

Figure 1:
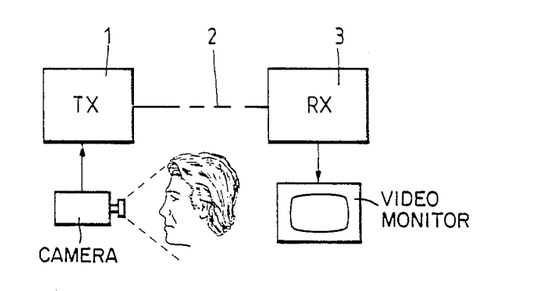
FIG. 1 is a block diagram of an image transmission system including an encoder and receiver according to embodiments of the invention.

FIG. 1 illustrates an image transmission system with a transmitter 1, transmission link 2 and receiver 3. The techniques employed are equally applicable to recording and the transmission link 2 could thus be replaced by a tape recorder or other means such as a semiconductor store.

The transmitter 1 receives an input video signal from a source such as a camera.

The moving image to be transmitted is the face 5 (FIG. 2) of a speaker whose speech is also transmitted over the link 2 to the receiver. During normal speech there is relatively little change in most of the area of the face -i.e. other than the mouth area indicated by the box 6 in FIG. 2. Therefore only one image of the face is transmitted. Moreover, it is found that changes in the mouth positions during speech can be realistically represented using a relatively small number of different mouth positions selected as typical. Thus a code-book of mouth positions is generated, and, once this has been transmitted to the receiver, the only further information that needs to be sent is a sequence of codewords identifying the successive mouth positions to be displayed.

The system described is a knowledge based system -i.e. the receiver, following a "learning" phase is assumed to "know" the speakers face and the set of mouth positions. The operation of the receiver is straightforward and involves, in the learning phase, entry of the face image into a frame store (from which an output video signal is generated by repetitive readout) and entry of the set of mouth positions into a further "mouth"store, and, in the transmission phase, using each received codeword to retrieve the appropriate mouth image data and overwrite the corresponding area of the image store.

Transmitter operation is necessarily more complex and here the learning phase requires a training sequence from the speaker, as follows:

(1) The first frame is stored and transmitted, suitably encoded (e.g. using conventional redundancy reduction techniques) to the receiver.

Figure 2:
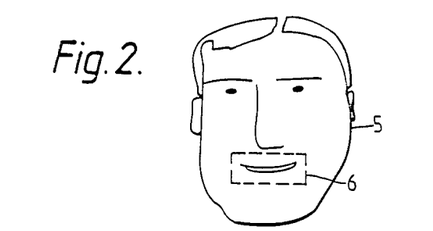
FIG. 2 illustrates an image to be transmitted.

(2) The stored image is analyzed in order to (a) identify the head of the speaker (so that the head in future frames may be tracked despite head movements), and (b) identify the mouth - i.e. define the box 6 shown in FIG. 2. The box co-ordinates (and dimensions, if not fixed) are transmitted to the receiver.

Figure 3:
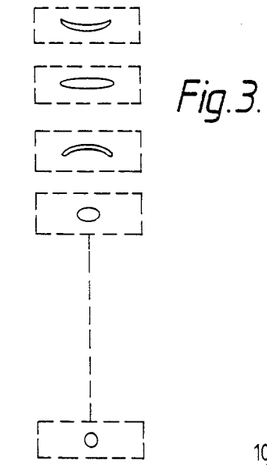
FIG. 3 illustrates a set of mouth shapes.

(3) Successive frames of the training sequence are analyzed to track the mouth and thus define the current position of the box 6, and to compare the contents of the box (the "mouth image") with the first and any previously selected images in order to build up a set of selected mouth images. This set of images (illustrated in FIG. 3) is stored at the transmitter and transmitted to the receiver.

The transmission phase then requires:

(4) Successive frames are analyzed (as in (3) above) to identify the position of the box 6;

(5) The content of the box in the current frame is compared with the stored mouth images to identify that one of the set which is nearest to it; the corresponding codeword is then transmitted.

Assuming a frame rate of 25/second and a "codebook" of 24 mouth shapes (i.e. a 5-bit code), the required data rate during the transmission phase would be 125bits/second.

The receiver display obtained using the basic system described is found to be generally satisfactory, but is somewhat unnatural principally because (a) the head appears fixed and (b) the eyes remain unchanged (specifically, the speaker appears never to blink). The first of these problems may be alleviated by introducing random head movement at the receiver; or by tracking the head position at the transmitter and transmitting appropriate co-ordinates to the receiver. The eyes could be transmitted using the same principles as applied to the mouth; though here the size of the "codebook" might be much less. Similar remarks apply to the chin, and facial lines.

The implementation of the transmitter steps enumerated above will now be considered in more detail, assuming a monochrome source image of 128×128 pel resolution, of a head and shoulders picture. The first problem is that of recognition of the facial features and pinpointing them on the face. Other problems are determining the orientation of the head and the changing shape of the mouth as well as the movement of the eyes. The method proposed by Nagao (M Nagao - "Picture Recognition and Data Structure", Graphic Languages - ed Nake and Rosenfield, 1972) is suggested.

Nagao's method involves producing a binary representation of the image with an edge detector. This binary image is then analyzed by moving a window down it and summing the edge pixels in each column of the window. The output from the window is a set of numbers in which the large numbers represent strong vertical edges. From this such features as the top and sides of the head, followed by the eyes, nose and mouth can be initially recognized.

The algorithm goes on to determine the outline of the jaw and then works back up the face to fix the positions of nose, eyes and sides of face more accurately. A feedback process built into the algorithm allows for repetition of parts of the search if an error is detected. In this way the success rate is greatly improved.

A program has been written using Nagao's algorithm which draws fixed size rectangles around the features identified as eyes and mouth. Details of this program are as follows:

A Laplacian operator is applied together with a threshold to give a binary image of the same resolution. Edge pixels become black, others white.

Figure 4:
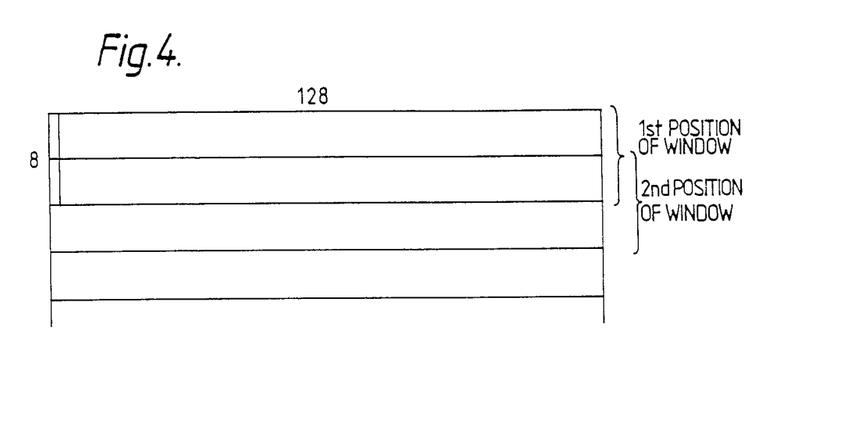
FIGS. 4, 5 and 6 illustrate masking windows used in face, eyes and mouth identification.

A window of dimension 128 pels×8 lines is positioned at the top of the binary image. The black pels in each column are summed and the result is stored as an entry in a 128×32 element array (ARRAY 1). The window is moved down the image by 4 lines each time and the process repeated. The window is repositioned 32 times in all and the 128×32 element array is filled. (FIG. 4).

A search is conducted through the rows of ARRAY 1 starting from the top of the image in order to locate the sides of the head. As these are strong vertical edges they will be identified by high values in ARRAY 1.

The first edge located from the left side of the image is recorded and similarly for the right side. The distance between these points is measured (head width) and if this distance exceeds a criterion a search is made for activity between the two points which may indicate the eyes.

Figure 5:
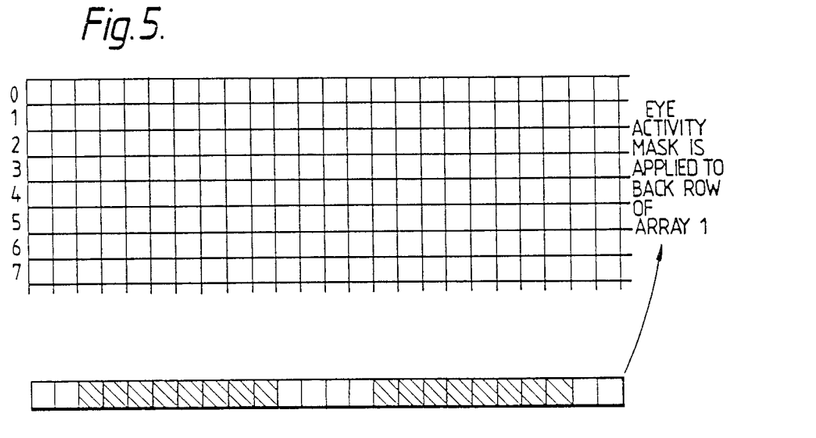

The eyes are found using a one-dimensional mask, as illustrated in FIG. 5 which has two slots corresponding to the eyes separated by a gap for the nose. The width of the slots and their separation is selected to be proportional to the measured head width. The mask is moved along a row within the head area. The numbers in ARRAY 1 falling within the eye slots are summed and from this result, the numbers in the nose slot are subtracted. The final result is a sensitive indicator of activity due to the eyes.

The maximum value along a row is recorded along with the position of the mask when this maximum is found. The mask is then moved down to the next row and the process repeated.

Out of the set of maximum values the overall maximum is found. The position of this maximum is considered to give the vertical position of the eyes. Using the horizontal position of the mask when this maximum was found we can estimate the midpoint of the face.

Figure 6:
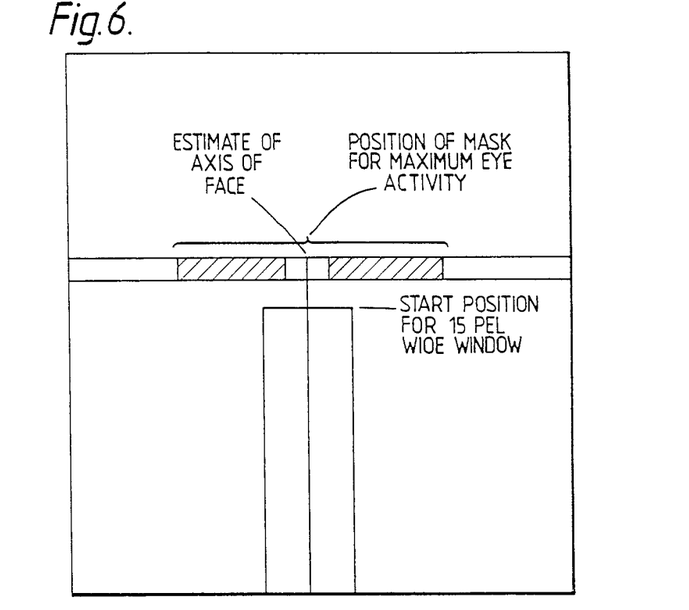

Next a fifteen pixel wide window, (FIG. 6) is applied to the binary image. It extends from a position just below the eyes to the bottom of the image and laterally is centered on the middle of the face.

Figure 7:
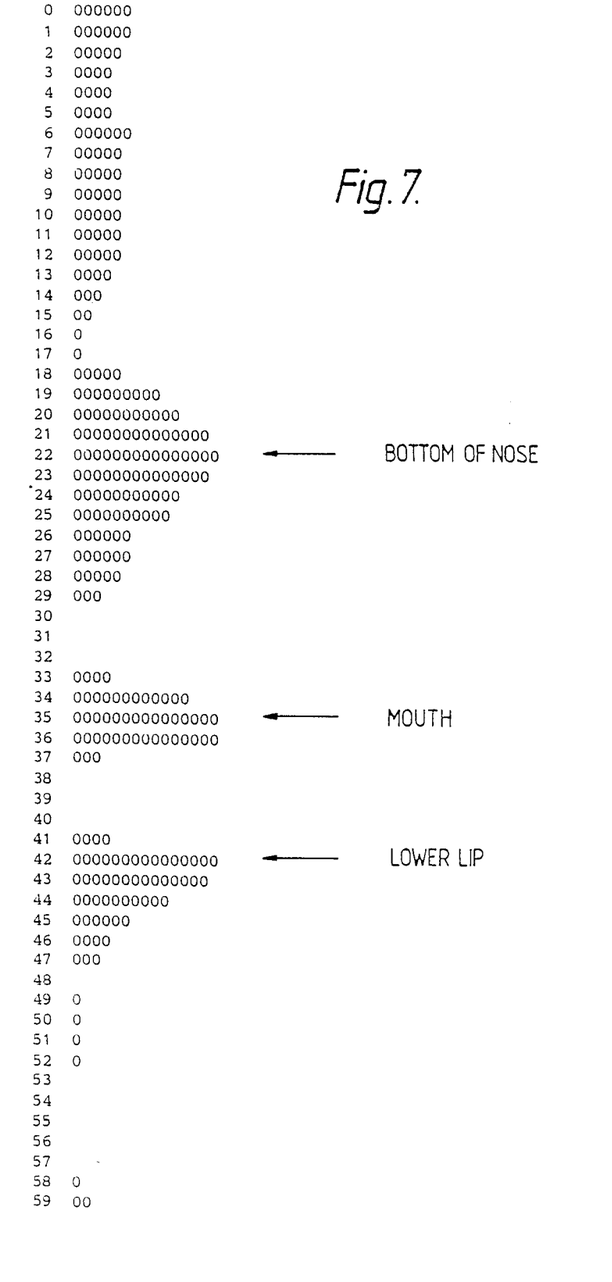
FIG. 7 is a histogram obtained using the mask of FIG. 6.

The black pels in each row of the window are summed and the values are entered into a one-dimensional array (ARRAY 2). If this array is displayed as a histogram, such features as the bottom of the nose, the mouth and the shadow under the lower lip show up clearly as peaks (FIG. 7). The distribution of these peaks is used to fix the position of the mouth.

The box position is determined centered on the center of the face as defined above, and on the center of the mouth (row 35 in FIG. 7); for the given resolution, on a suitable box size might be 40 pels wide by 24 high.

The next stage is to ensure that the identification of the mouth (box position) in the first frame and during the learning (and transmission) phase is consistent - i.e. that the mouth is always centered within the box. Application of Nagao's algorithm to each frame of a sequence in turn is found to show a considerable error in registration of the mouth box from frame to frame.

A solution to this problem was found by applying the algorithm to the first frame only and then tracking the mouth frame by frame. This is achieved by using the mouth in the first frame of the binary sequences as a template and auto-correlating with each of the successive frames in the binary image referred to above. The search is started in the same relative position in the next frame and the mask moved by 1 pixel at a time until a local maximum is found.

The method was used to obtain a sequence using the correct mouth but copying the rest of the face from the first frame. This processed sequence was run and showed some registration jitter, but this error was only about one pixel, which is the best that can be achieved without sub-pixel interpolation.

Figure 8:
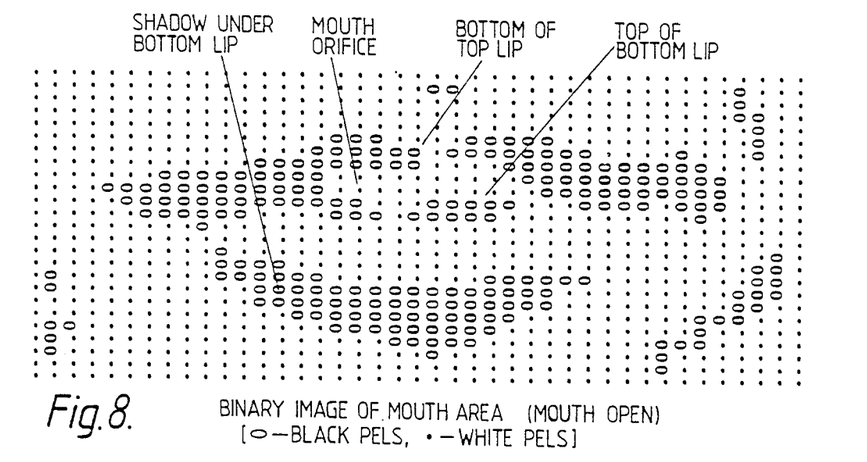
FIGS. 8 and 9 illustrate binary images of the mouth area of an image.
Figure 9:
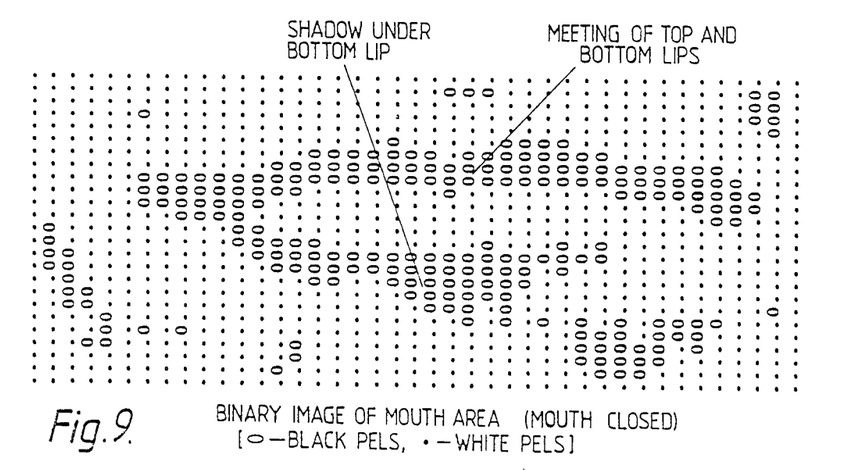

Typical binary images of the mouth area (mouth open and mouth closed) are shown in FIGS. 8 and 9.

Only a small set of mouths from the total possible in the whole sequence can be stored in the look-up table, for obvious reasons. This requires the shape of a mouth to be recognized and whether it is similar to a shape which has occurred previously or not. New mouth positions would then be stored in the table.

The similarity of difference of a mouth to previously occurring mouths thus needs to be based on a quantization process in order to restrict the number of entries in the table.

The method by which this is achieved is as follows, all processing being carried out on greyscale mouth images rather than the binary version referred to above.

The mouth image from the first frame is stored as the first—initially the only entry in a look-up table. The mouth image from each frame in the training sequence is then processed by (a) comparing it with each entry in the table by subtracting the individual pel values and summing the absolute values of those differences over the mouth box area; (b) comparing the sum with a threshold value and, if the threshold is exceeded, entering that mouth image as a new entry in the table.

However, this particular method of finding the sum of the absolute differences is very susceptible to movement. For example, two identical images where the second one has been shifted by just one pixel to the left would produce a very low value for the sum, whereas these two images should be seen as identical. If a small degree of movement within the overall tracking is permitted to try to compensate for the fact that the sum falls off dramatically if the image is displaced by only one pixel then a reduction in the size of the look-up table can be achieved without a corresponding loss of mouth shapes. This can be done if, at each frame, the mouth in the current frame is compared three times with each of the code-book entries—at the current position, shifted to the left by one pixel, and shifted to the right by one pixel, and the minimum sum found in each case. The result generating the smallest minimum sum together with the value of the shift in the x-direction is recorded. This movement could, of course, be performed in both the x- and the y- directions, but it has been found that the majority of movement is in the x-direction.

If the desired table size is exceeded, or the number of entries acquired during the training sequence is substantially lower than the table size, then the threshold level is adjusted appropriately and the learning phase repeated; to avoid excessive delay such conditions might be predicted from the acquisition rate.

Once the table has been constructed, the transmission phase can commence, in which each successive mouth image is compared—as described in (a) above—with all those of the stored table and a codeword identifying the entry which gave the lowest summation result is then transmitted.

The computation required to do this is large but can be decreased if an alternative searching method is adopted. The simplest alternative would be instead of looking at all the mouths in the look-up table and finding the minimum sum, to use the first one that has a sum which is less than the threshold. On its own, this would certainly be quicker, but would be likely to suffer from a large amount of jerkiness if the order in which the table is scanned were fixed. Therefore the order in which the table is scanned needs to be varied. A preferred variation requires a record of the order in which mouths from the code-book appear—a sort of rank-ordering—to be kept. For example, if the previous frame used mouth 0 from the table, then one scans the table for the current frame starting with the entry which has appeared most often after mouth 0 in the past, mouth 5 say. If the sum of the absolute differences between the current frame and mouth 5 is less than the threshold then mouth 5 is chosen to represent the current frame. If it is greater than the threshold, move along to the next mouth in the code-book which has appeared after mouth 0 the second most often, and so on. When a mouth is finally chosen, the record of which mouth is chosen is updated to include the current information.

Optionally, mouth images have a lowest summation result above a set value might be recognized as being shapes not present in the set and initiate a dynamic update process in which an additional mouth image is appended to the table and sent to the receiver during the transmission phase. In most circumstances transmission of the "new" mouth would not be fast enough to permit its use for the frame giving rise to it, but it would be available for future occurrences of that shape.

Care must be taken in this case that the set value is not too low because this can result in new mouths being placed into the look-up table all the way through the sequence. And this is no more than image sub-sampling which would obviously produce a reasonable result but which would need a code-book whose size is proportional to the length of the sequence being processed.

The set value can be arrived at through trial and error. It would obviously be desirable if this threshold could be selected automatically, or dispensed with altogether. The sum of the absolute differences between frames is always a positive measure, and the look-up table therefore represents a metric space. Each mouth in the look-up table can be thought of as existing in a multi-dimensional metric space, and each frame in a sequence lies in a cluster around one of these codebook mouths. Various algorithms such as the Linde-Buzo-Gray exist which could be used to find the optimum set of mouths. These algorithms use the set of frames in the sequence as a training set and involve lengthy searches to minimize the error and find the optimum set. Preferable to this is to find a "representative" set of mouths which are sub-optimal, but which can be found more quickly than the optimum set. In order to do this it is necessary to specify the number of mouths that are to be used, and then to select the required number of mouths from the training sequence. The look-up table can still be updated during the transmission phase using the same algorithm as for training, but the total number of mouths in the table will remain constant.

The selection of mouths follows a basic rule—if the minimum distance (distance can be used since it is a metric space) between the current frame and one of the mouths in the table is greater than the minimum distance between that mouth in the table and any other mouth in the table then the current mouth should be included in the table. If it is less, then that mouth is simply represented by the nearest mouth in the table. When a new mouth is to be included in the table during a transmission phase then the mouth that has to be removed is selected according to the following rule - find the pair of mouths in the look-up table that are closest together and throw one of them away, preferably the one that is nearest to the new mouth.

When a new mouth is entered in the table, then clearly it has no past history with which to order the other mouths in the code-book - each will never have appeared after this new mouth. When the next frame in the sequence is encountered, the look-up table would be scanned in order, arriving at the new entry last. However, this new entry is the most likely choice, since mouths tend to appear in clumps, particularly just after a new mouth has been created. So the ordering is adjusted so that the new mouth is scanned first.

The above-described transmission system might be employed in a picture-phone system employing a standard telephone link; to allow for the learning phase, the image would not immediately appear at the receiver. Following the initial delay—perhaps 15 seconds assuming non-digital transmission of the face—the moving picture would be transmitted and displayed in real time.

A fixed mouth overlay can be used on a face orientated differently from the forward facing position if the difference is not too large. Also, it is clear that in order to show general movements of the head such as nodding and shaking one must display the face as seen from a number of different angles. A displayed head is unconvincing unless there is some general movement, if only random movement.

Figure 10:
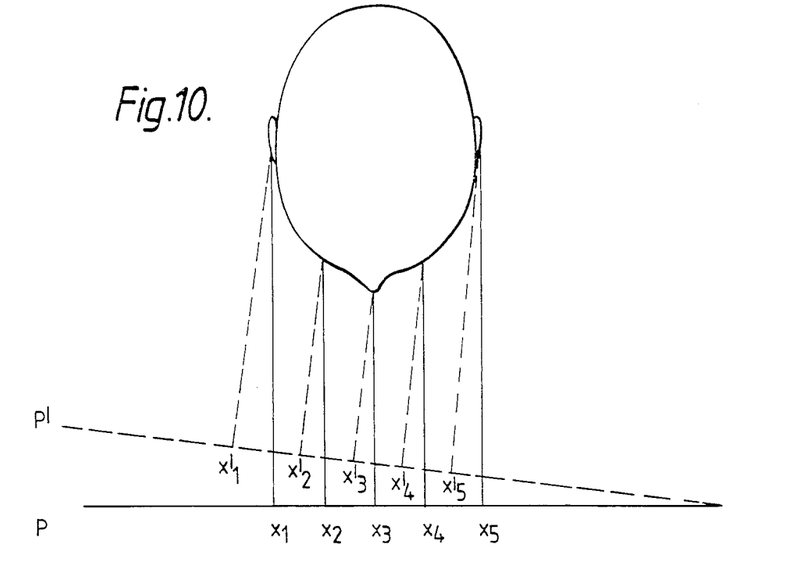
FIGS. 10 and 11 are plan and elevational views of a head to illustrate the effects of changes in orientation.

In a system such as the one described, different views of the face would have to be transmitted and stored at the receiver. If a complete set of data were sent for every different face position this would require excessive channel and storage capacities. A possible way around the problem is shown in FIG. 10.

The appearance of the face in the frontal position is represented by the projection (x1-x5) in plane P. If the head is turned slightly to one side its appearance to the observer will now be represented by (x1'—x5') in plane P'. If the illumination of the face is fairly isotropic then a two dimensional transformation of (x1-x5) should be a close approximation to (x1'-x5').

The important differences would occur at the sides of the head where new areas are revealed or occluded and, similarly, at the nose. Thus by transmitting a code giving the change in orientation of the head as well as a small set of differences, the whole head could be reconstructed. The differences for each head position could be stored and used in the future if the same position is identified.

Figure 11:
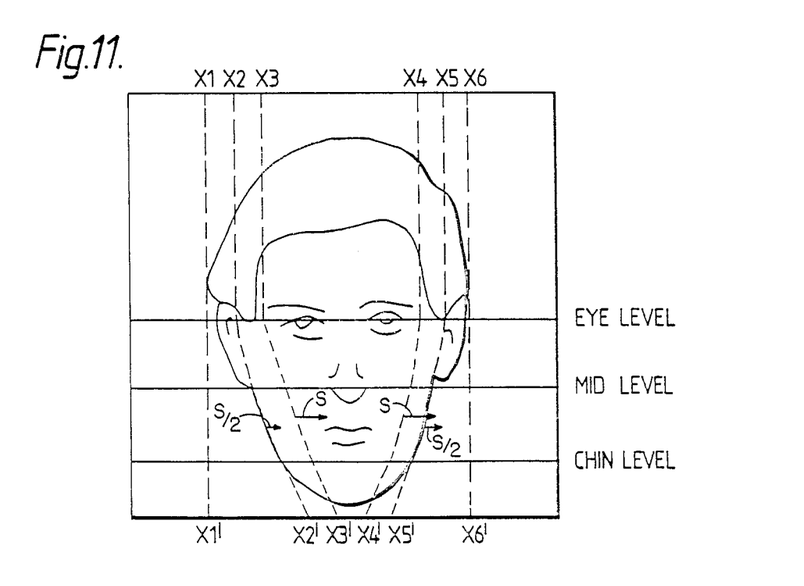

The concept of producing pseudo-rotations by 2-D transformation is illustrated with reference to the "face" picture of FIG. 11.

To simulate the effect of vertical axis rotation in a direction such that the nose moves by a displacement S from left to right (as viewed):

(1) Points to the left of (X1-X1') do not move.

(2) Points on the line (X2-X2') move to the right with displacements S/2. (Region (X1,X1',X2,X2') is stretched accordingly).

(3) Points on the line (X3-X3') move to the right with displacement S. (Region X2,X2',X3,X3') is stretched).

(4) Points on the line (X4-X4') moves to the right by displacement S. (Region (X3,X3',X4,X4') is translated to right).

(5) Points on the line (X5-X5') move to the right; displacement S/2. (Region (X4,X4',X5,X5') is shrunk).

(6) Points to the right of the line (X6-X6') do not move. (Region X5,X5',X6,X6' is shrunk).

Two-dimensional graphical transformations could be used in a system for a standard videoconferencing application. In this system, human subjects would be recognized and isolated from non-moving foreground and background objects. Foreground and background would be stored in memory at different hierarchical levels according to whether they were capable of occluding moving objects. Relatively unchanging moving bodies such as torsos would be stored on another level as would more rapidly changing parts such as the arms and head.

The principle of operation of the system would require the transmission end to identify movement of the various segmented parts and send motion vectors accordingly. These would be used by the receiver to form a prediction for each part in the next frame. The differences between the prediction and the true picture would be sent as in a standard motion compensation system.

The system should achieve high data compression without significant picture degradation for a number of reasons:

(1) If an object is occluded and then revealed once more the data does not have to be retransmitted.

(2) For relatively unchanging bodies such as torsos a very good prediction could be formed using minor graphical transformations such as translations and rotations in the image plane and changes of scale. The differences between the prediction and the true should be small.

(3) For the more rapidly moving objects a good prediction should still be possible although the differences would be greater.

(4) It could treat subjectively important features in the scene differently from the less important features. For instance, faces could be weighted more heavily than rapidly moving arms.

A second embodiment of the invention relates to the synthesis of a moving picture of a speaker to accompany synthesized speech. Two types of speech synthesis will be considered:

(a) Limited vocabulary synthesis in which digitized representations of complete words are stored and the words are retrieved under control of manual, computer or other input and regenerated. The manner of storage, whether PCM or as formant parameters for example does not affect the picture synthesis.

(b) Allophone synthesis in which any word can be synthesized by supplying codes representing sounds to be uttered; these codes may be generated directly from input text (text to speech systems).

In either case there are two stages to the face synthesis; a learning phase corresponding to that described above, and a synthesis phase in which the appropriate mouth codewords are generated to accompany the synthesised speech.

Considering option (a) first, the speech vocabulary will usually be generated by recording the utterances of a native speaker and it will often be convenient to use the face of the same speaker. If another face is desired, or to add a vision facility to an existing system, the substitute speaker can speak along with a replay of the speech vocabulary. Either way the procedure is the same. The learning phase is the same as that described above, in that the system acquires the required face frame and mouth look-up table. However it must also record the sequence of mouth position codewords corresponding to each word and store this sequence in a further table (the mouth code table). It is observed that this procedure does not need to be carried out in real time and hence offers the opportunity of optimizing the mouth sequences for each word.

In the synthesis phase input codes supplied to the synthesizer are used not only to retrieve the speech data and pass it to a speech regeneration unit synthesizer but also to retrieve the mouth codewords and transmit these in synchronism with the speech to a receiver which reconstructs the moving pictures as described above with reference to FIG. 1. Alternatively the receiver functions could be carried out locally, for local display or for onward transmission of a standard video signal.

In the case of (b) allophone synthesis, a real face is again required and the previously described learning phase is carried out to generate the face image and mouth image table. Here however it is necessary to correlate mouth positions with individual phonemes (i.e. parts of words) and thus the owner of the face needs to utter, simultaneously with its generation by the speech synthesizer, a representative passage including at least one example of each allophone which the speech synthesizer is capable of producing. The codewords generated are then entered into a mouth look-up table in which each entry corresponds to one allophone. Most entries will consist of more than one codeword. In some cases the mouth positions corresponding to a given phoneme may vary in dependence on the preceding or following phonemes and this may also be taken into account. Retrieval of the speech and video data takes place in similar manner to that described above for the "whole word" synthesis.

Note that in the "synthetic speech" embodiment the face frame, mouth image table and mouth position code words may, as in the transmission system described above be transmitted to a remote receiver for regeneration of a moving picture, but in some circumstances, e.g. a visual display to accompany a synthetic speech computer output, the display may be local and hence the "receiver" processing may be carried out on the same apparatus as the table and codeword generation. Alternatively, the synthesized picture may be generated locally and a conventional video signal transmitted to a remote monitor.

The question of synchronization will now be considered further.

A typical text-to-speech synthesis comprises he steps of:

(a) Conversion of plain text input to phonetic representation.

(b) Conversion of phonetic to lower phonetic representation. (c) Conversion of lower phonetic to formant parameters; a typical parameter update period would be 10 ms.

This amount of processing involves a degree of delay; moreover, some conversion stages have an inherent delay since the conversion is context dependent (e.g. where the sound of a particular character is influenced by those which follow it). Hence the synthesis process involves queueing and timing needs to be carefully considered to ensure that the synthesised lip movements are synchronized with the speech.

Where (as mooted above) the visual synthesis uses the allophone representation as input data from the speech synthesizer, and if the speech synthesis process from that level downward involves predictable delays then proper timing may be ensured simply by introducing corresponding delays in the visual synthesis.

An alternative proposal is to insert flags in the speech representations. This could permit the option of programming mouth positions into the source text instead of (or in addition to) using a lookup table to generate the mouth positions from the allophones. Either way, flags indicating the precise instants at which mouth positions change could be maintained in the speech representations down to (say) the lower phonetic level. The speech synthesizer creates a queue of lower phonetic codes which are then converted to formant parameters and passed to the formant synthesizer hardware; as the codes are "pulled off" the queue, each flag, once the text preceding it has been spoken is passed to the visual synthesizer to synchronize the corresponding mouth position change.

A third embodiment of the invention concerns the generation of a moving face to accompany real speech input.

Again, a surrogate speaker is needed to provide the face and the learning phase for generation of the mouth image table takes place as before. The generation of the mouth code table depends on the means used to analyze input speech; however, one option is to employ spectrum analysis to generate sequences of spectral parameters (a well known technique), with the code table serving to correlate those parameters and mouth images.

Figure 12:
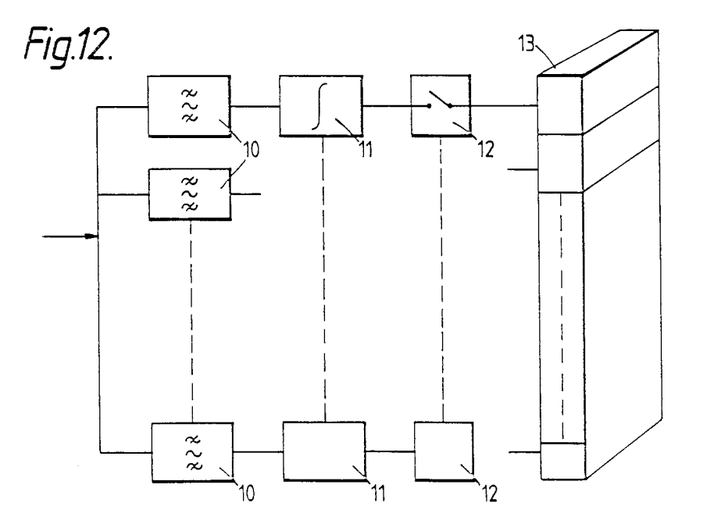
FIG. 12 illustrates apparatus for speech analysis.

Apparatus for such speech analysis is shown in FIG. 12. Each vowel phoneme has a distinct visual appearance. The visual correlate of the auditory phoneme is called a viseme [K W Berger - Speechreading: Principles and Methods. Baltimore: National Educational Press, 1972. p73–107]. However many of the consonants have the same visual appearance and the most common classification of consonant visemes has only 12 categories. This means that there will be no visible error if the system confuses phonemes belonging to the same category. Since there is less acoustic energy generated in consonant formation than vowel formation it would be more difficult for a speech recongnizer to distinguish between consonants. Thus the many to one mapping of consonant phonemes to consonant visemes is fortuitous for this system.

A method of analyzing speech would use a filter bank 10 with 14–15 channels covering the entire speech range. The acoustic energy in each channel is integrated using a leaky integrator 11 and the output sampled 12 at the video frame rate (every 40 ms). A subject is required to pronounce during a training sequence a full set of phoneme sounds and the filter bank amalyze the speech. Individual speech sounds are identified by thresholding the energy over each set of samples. The sample values are stored in a set of memory locations 13 which are labelled with the appropriate phoneme name. These form a set of templates which subsequently are used to identify phonemes in an unknown speech signal from the same subject. This is done by using the filter bank to analyze the unknown speech at the same sampling rate. The unknown speech sample is compared with each of the templates by summing the squares of the differences of the corresponding components. The best match is given by the smallest difference. Thus the device outputs a code corresponding to the best phoneme match. There would also be a special code to indicate silence.

While the subject uttered the set of phonemes during the training sequence a moving sequence of pictures of the mouth area is captured. By pinpointing the occurrence of each phoneme the corresponding frame in the sequence is located and a subset of these frames is used to construct a code-book of mouths. In operation a look-up table is used to find the appropriate mouth code from the code produced by the speech analyzer. The code denoting silence should invoke a fully closed mouth position. A synthetic sequence is created by overlaying the appropriate mouth over the face at video rate.

As with the case of synthesized speech, the "receiver" processing may be local or remote. In the latter case, it is proposed, as an additional modification, that the mouth image table stored at the transmitter might contain a larger number of entries than is normally sent to the receiver. This would enable the table to include mouth shapes which, in general, occur only rarely, but may occur frequently in certain types of speech: for example, shapes which correspond to sounds which occur only in certain regional accents. Recognition of the spectral parameters corresponding to such a sound would then initiate the dynamic update process referred to earlier to make the relevant mouth shape(s) available at the receiver.

Figure 13:
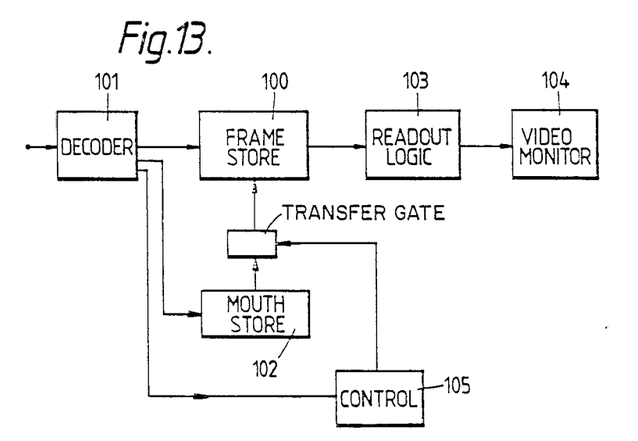
FIG. 13 is a block diagram of a receiver embodying the invention.

The construction of appropriate display (receiver) arrangements for the above proposals will now be further considered (see FIG. 13).

A frame store 100 is provided, into which during the learning phase the received still frame is entered from an input decoder 101, while "mouth" store 102 stores the desired number (say 25) mouth positions. Readout logic 103 repeatedly reads the contents of the frame store and adds synchronizing pulses to feed a video monitor 104. In the transmission phase, received codewords are supplied to a control unit 105 which controls overwriting of the relevant area of the frame store 100 with the corresponding mouth store entry. Clearly this overwriting needs to be rapid so as not to be visible to the viewer. These effects could be reduced by dividing the update area into small blocks and overwriting in a random or predefined non-sequential manner. Alternatively if the frame store architecture includes windows or sprites then these could be preloaded with the picture updates and switched in and out to create the appropriate movement. In some cases it may be possible to simplify the process by employing x - y shifting of the window/sprite.

We claim:

1. An apparatus for encoding a moving image including a human face comprising:
    means for receiving video input data;
    means for output of data representing one frame of the image;
    identification means arranged in operation for each frame of the image to identify that part of the input data corresponding to the mouth of the face represented and
    (a) in a first phase of operation to compare the mouth data parts of each frame with those of other frames to select a representative set of mouth data parts, to store the selected parts and to output the selected parts;
    (b) in a second phase to compare the mouth data part of each frame with those of the stored set and to generate a codeword indicating which member of the set the mouth data part of that frame most closely resembles.

2. An apparatus according to claim 1 in which the identification means is arranged in operation firstly to identify that part of one frame of input data corresponding to the mouth of the face represented and to identify the mouth part of successive frames by auto-correlation with data from the said one frame.

3. An apparatus according to claim 1 or 2 in which the identification means is arranged in operation during the first phase to store a first mouth data part and then for the mouth data parts of each successive frame to compare it with the first and any other stored mouth data part and if the result of the comparison exceeds a threshold value, to store it.

4. An apparatus according to claim 1, or 2 in which the comparison of mouth data is carried out by subtraction of individual picture element values and summing the absolute values of the differences.

5. An apparatus according to claim 1, or 2 including means for tracking the face position within the image and generating coded data representing that position.

6. An apparatus according to any one of the preceding claims 1 or 2, in which the identification means is arranged during the second phase in the event that the result of the comparison between a mouth data part and that one of the stored set which it most closely resembles exceeds a predetermined threshold to output that data part and store it as part of the stored set.

7. An apparatus according to any one of the preceding claims 1 or 2 further including identification means arranged in operation for each frame of the image to identify that part of the input data corresponding to the eyes of the face represented and
    (a) in the first phase of operation to compare, for each frame, the eye data part thus identified with those of other frames to eye data parts of each frame with those of other frames to select a representative set of eye data parts, to store the selected parts and to output the selected parts;
    (b) in the second phase to compare the eye data part of each frame with those of the stored set of eye data parts and to generate a codeword indicating which member of the set the eye data part of that frame most closely resembles.

8. An image transmission system comprising an encoding apparatus according to any one of claims 1 or 2 and a receiver for decoding a moving image including a human face, the receiver comprising:
    frame store means for receiving and storing data representing one frame of the image;
    means for repetitive readout of the frame store to produce a video signal;
    further store means receiving and storing a set of selected mouth data parts; and
    control means arranged in operation to receive input codewords and in response to each codeword to read out the corresponding mouth data part from the further store and to effect insertion of that data into the data supplied to the readout means.

9. A receiver for decoding a moving image including a human face, the receiver comprising:

frame store means for receiving and storing data representing one frame of the image;

means for repetitive readout of the frame store to produce a video signal;

further store means receiving and storing a set of selected mouth data parts; and control means arranged in operation to receive input codewords and in response to each codeword to read out the corresponding mouth data part from the further store and to effect insertion of that data into the data supplied to the readout means.

10. A receiver according to claim 9 in which the control means is arranged to overwrite the frame store with the mouth data.

11. A receiver according to claim 9 in which the control means is arranged to supply the mouth data to the readout means.

12. A receiver according to claim 9, 10 or 11 including means responsive to input data to effect corresponding movement of the face within the area of the image.

13. A receiver according to claim 9, 10 or 11 including means arranged to effect random movement of the face within the area of the image.

14. A speech synthesiser including means for synthesis of a moving image including a human face, comprising;

(a) means for storage and output of the image of a face;

(b) means for storage and output of a set of mouth data blocks each corresponding to the mouth area of the face and representing a respective different mouth shape;

(c) speech synthesis mans responsive to input information identifying words or parts of words to be spoken;

(d) means storing a table relating words or part of words to codewords identifying mouth data blocks or sequences thereof;

(e) control means responsive to the said input information to select for output the corresponding codewords or codeword sequences from the table.

15. A synthesiser according to claim 14 in which the speech synthesis means includes means arranged in operation for processing and queuing the input information, the queue including flag codes indicating changes in mouth shape, and responsive to each flag code to transmit to the control means an indication following generation of the speech preceding that code in the queue, whereby the control means may synchronise the codeword output to the synthesised speech.

16. An apparatus for synthesis of a moving image, comprising:

(a) means for storage and output of the image of a face;

(b) means for storage and output of a set of mouth data blocks each corresponding to the mouth area of the face and representing a respective different mouth shape;

(c) an audio input for receiving speech signals and frequency analysis means responsive to such signals to produce sequences of spectral parameters;

(d) means storing a table relating spectral parameter sequences to codewords identifying mouth data blocks or sequences thereof;

(e) control means responsive to the said spectral parameters to select for output the corresponding codewords or codeword sequences from the table.

17. An apparatus according to claim 14, 15 or 16 including a receiver for decoding a moving image including a human face, the receiver comprising:

frame store means for receiving and storing data representing one frame of the image;

means for repetitive readout of the frame store to produce a video signal;

further store means receiving and storing a set of selected mouth data parts; and control means arranged in operation to receive input codewords and in response to each codeword to read out the corresponding mouth data part from the further store and to effect insertion of that data into the data supplied to the readout means.

* * * * *